US005550459A

United States Patent [19]

Laplace

[11] Patent Number: 5,550,459

[45] Date of Patent: Aug. 27, 1996

[54] TAP POSITION DETERMINATION BASED ON REGULAR IMPEDANCE CHARACTERISTICS

[75] Inventor: Carl J. Laplace, Raleigh, N.C.

[73] Assignee: Siemens Energy & Automation, Inc., Alpharetta, Ga.

[21] Appl. No.: 287,438

[22] Filed: Aug. 8, 1994

[51] Int. Cl.[6] .................... G06F 15/56

[52] U.S. Cl. .................... 323/255; 364/483; 364/492

[58] Field of Search .................... 323/256, 260, 323/255; 364/492–493, 487; 324/76.39, 76.52, 76.75, 76.77

[56] References Cited

U.S. PATENT DOCUMENTS 4,612,617 9/1986 Laplace Jr. .................... 364/483

5,315,527 5/1994 Beckwith .................... 364/483

*Primary Examiner*—Peter S. Wong

*Assistant Examiner*—Abitya Krishnan

[57] ABSTRACT

A voltage regulator controller includes means for determining the tap position based on regulator impedance characteristics. In a preferred embodiment, the tap position determination system is embodied as part of an regulator designed to operate within a fixed percentage range of regulation (e.g. ±10%) with the identical number of turns between each of its series winding taps. In this environment, the regulator tap position is determined as a function of the regulator input voltage, the regulator output voltage, the regulator series winding current, system load power factor and internal regulator impedance.

20 Claims, 7 Drawing Sheets

FIG. 6

336a

| | |
|---|---|
| MODEL # 1 | Areg1 , Zn1 , Ztp1 , Wsc1 |
| MODEL # 2 | Areg2 , Zn2 , Ztp2 , Wsc2 |
| MODEL # 3 | Areg3 , Zn3 , Ztp3 , Wsc3 |
| MODEL # 4 | Areg4 , Zn4 , Ztp4 , Wsc4 |
| MODEL # 5 | Areg5 , Zn5 , Ztp5 , Wsc5 |
| MODEL # 6 | Areg6 , Zn6 , Ztp6 , Wsc6 |
| MODEL # 7 | Areg7 , Zn7 , Ztp7 , Wsc7 |

TAP POSITION DETERMINATION BASED ON REGULAR IMPEDANCE CHARACTERISTICS

FIELD OF THE INVENTION

This invention relates to voltage regulators and related control systems.

BACKGROUND OF THE INVENTION

A step type voltage regulator is a device which is used to maintain a relatively constant voltage level in a power distribution system. Without such a regulator, the voltage level of the power distribution system could fluctuate significantly and cause damage to electrically powered equipment.

A step type voltage regulator can be thought of as having two parts: a transformer assembly and a controller. A conventional step type voltage regulator transformer assembly 102 and its associated controller 106 are shown in FIG. 1. The voltage regulator transformer assembly can be, for example, a Siemens JFR series. The windings and other internal components that form the transformer assembly 102 are mounted in an oil filled tank 108. A tap changing mechanism (not shown) is commonly sealed in a separate chamber in the tank 108.

The various electrical signals generated by the transformer are brought out to a terminal block 110, which is covered with a waterproof housing, and external bushings S, SL, L for access. An indicator 112 is provided so that the position of the tap as well as its minimum and maximum positions can be readily determined.

A cabinet 114 is secured to the tank to mount and protect the voltage regulator controller 106. The cabinet 114 includes a door (not shown) and is sealed in a manner sufficient to protect the voltage regulator controller 106 from the elements. Signals carried between the transformer or tap changing mechanism and the voltage regulator controller 106 are carried via an external conduit 116.

The tap changing mechanism is controlled by the voltage regulator controller 106 based on the controller's program code and programmed configuration parameters. In operation, high voltage signals generated by the transformer assembly 102 are scaled down for reading by the controller 106. These signals are used by the controller 106 to make tap change control decisions in accordance with the configuration parameters and to provide indications of various conditions to an operator.

In order to ensure proper operation, the regulator controller must keep accurate track of the current tap position of the voltage regulator transformer. For example, tap position knowledge is used by the regulator controller for overcurrent operation (sometimes referred to as Vari-amp), systems performance analysis and control, maintenance and safety. For overcurrent operation, tap position knowledge is essential to limit operation of the regulator within acceptable tap position excursions, thereby permitting safe operation of load current outside of the operational maximums as a direct function of tap position.

Tap position knowledge is also a factor in system performance and analysis. This includes the ability to establish statistics on regulator operation such as range and frequency of tap position excursions and associated times and dates. This information may be transferred to a remote location via a communication link.

For maintenance and safety, it is important to place the regulator in the neutral position prior to safe bypass and shutdown. Knowledge of the actual tap position can be used as a fail-safe in conjunction with a neutral position indicator to confirm that the regulator is indeed in the neutral position.

One conventional way to determine tap position is via an electro-mechanical dial that physically attaches to the tap changer mechanism. The electro-mechanical technique has several disadvantages which include high manufacturing cost and inability to communication tap position to a remote location or to the local control without the expense of additional electronic encoded.

Electronic techniques for directly encoding the tap position include the use of digital and analog position encoders. Other indirect means of electronic position encoding that provide a lower cost solution employ various "dead reckoning" methods wherein existing digital and analog signals (e.g. neutral position, tap change command, tap change response, raise/lower command and tap change load current) are used by the controller to derive a tap position.

While "dead reckoning" is lower cost than using an electro-mechanical indicator with an encoder, it is inherently less reliable since it depends on indirect methods to determine position which can cause the tap position to become unknown (lost) or in error.

SUMMARY OF THE INVENTION

In accordance with the present invention, a voltage regulator controller includes means for determining the tap position based on regulator impedance characteristics. In a preferred embodiment, the tap position determination system is embodied as part of an regulator designed to operate within a fixed percentage range of regulation (e.g. ±10%) with the identical number of turns between each of its series winding taps. In this environment, the regulator tap position is determined as a function of the regulator input voltage, the regulator output voltage, the regulator series winding (line) current, system load power factor and internal regulator impedance. In the preferred embodiment, it is assumed that the series winding will be compensated as some percentage value (e.g. 3.5%) for internal regulation considerations.

BRIEF DESCRIPTION OF THE DRAWINGS

FIG. 6 shows an organization of the parameter look-up table in the EEPROM memory of FIG. 3;

Like reference numerals appearing in more than one figure represent like elements.

DETAILED DESCRIPTION OF THE PREFERRED EMBODIMENT

An embodiment of the present invention will now be described by reference to FIGS. 2 through 8.

Figure 3:
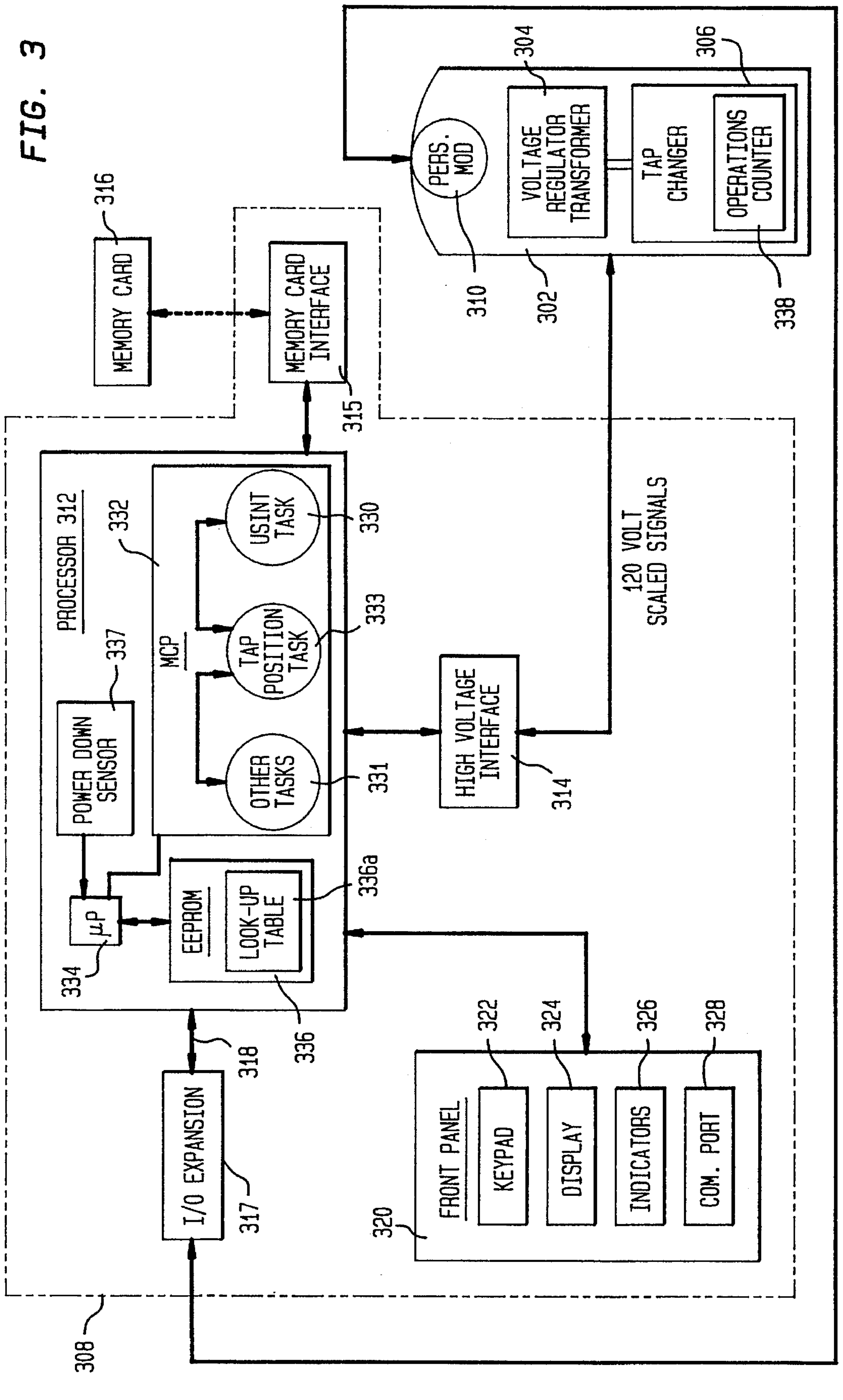
FIG. 3 is a block diagram of a voltage regulator controller in accordance with an embodiment of the present invention.

A step type voltage regulator and its associated controller according to an embodiment of the present invention are shown in FIG. 3. The voltage regulator transformer assembly 302 can be, for example, a Siemens JFR series but in any event is of a conventional type which includes a multi-tap transformer 304 and an associated tap changer (tap changing mechanism) 306. The tap changer 306 is controlled by the voltage regulator controller 308 which receives signals indicative of voltage and current in the windings of the transformer 304 and conventionally generates tap control signals in accordance with operator programmed set-points and thresholds for these signals. The voltage regulator 302 can also be provided with a nonvolatile memory (personality module) 310 which stores statistics and historical information relating to the voltage regulator.

The voltage regulator controller 308 includes a processor section (processor board) 312, a high voltage interface 314, a PCMCIA memory card interface 315 (for receiving a conventional PCMCIA standard memory card 316), an I/O expansion chassis (rack) 317 which is coupled to the processor section 312 by way of a bus 318 and a front panel 320 which is coupled to the processor section.

The front panel 320 provides an operator interface including a keypad 322, a character display 324, indicators 326 for various regulator conditions and a serial communications port connector 328. A user interface task (usint) 330 running under the processor section's main control program (mcp) 332 monitors activity on the keypad 322 and provides responses to the character display 324 as needed. The front panel 320, its associated operator interface and the user interface task 330 can be of the type described in U.S. patent application Ser. No. 07/950,402; filed on Sep. 23, 1992, which is incorporated by reference in its entirety as if printed in full below.

The processor section 312 generates digital control signals based on internal program code and operator selected parameters entered (by an operator) via the controllers front panel 320. The processor section 312 is controlled by a microprocessor (Up) 334. The microprocessor 334 is coupled to a serial electrically erasable read only programmable memory (EEPROM) 336 which stores the operations count and operator programmed configuration data.

The EEPROM also stores a parameter look-up table **336*a* which stores cross references between transformer nameplate information (or model number) and the electrical parameters of the particular transformers identified by the nameplate information. The microprocessor 334 is also coupled to a power down sensor 337** which can be embodied using a zero-cross detector.

In operation, high voltage signals are generated by the voltage regulator transformer 304. As shown in FIG. 5, these signals are scaled down via internal voltage potential transformers PT1, PT2 and a current transformer CT1, all of which are interim routed to the high voltage interface 314. The high voltage interface 314, in turn, further scales the transformed down signals for reading by an analog to digital converter (shown in FIG. 4) within the processor section 312. The data fed back from the voltage regulator 402 is used by the processor section 312 to make tap change control decisions and to provide indication of various conditions to an operator.

The processor board monitors tap changes by sensing an "Operations Counter" signal from the transformer assembly 304. The Operations Counter signal is generated by an electronic switch (operations counter switch) 338 located on the tap changer mechanism 306. Each time the tap position changes, the operations counter switch 338 is toggled from one position to the other. If the switch 338 is open before the tap change, it closes as the tap change occurs; and vice-versa.

In addition to the user interface task 330, the microprocessor also executes a number of other tasks 331 which control operation of the voltage regulator. For example, a power monitoring task monitors the power down sensor 337. If a power loss is detected, the power monitoring task initiates a power down sequence which shuts off or suspends all active tasks except itself. After shutting off all other active tasks, the power down task saves the operations counter value to the EEPROM 336.

In accordance with an embodiment of the present invention, the microprocessor also executes of a tap position determination task 333 which also runs under control of the mcp 332. The tap position determination task derives the regulator's tap position in accordance with the method shown in FIG. 2. The tap position determination task is preferably invoked by the mcp 332 at a minimum of once per second.

Values for a number of the parameters used in the tap position determination are stored in the parameter look up table **336*a* formed in the EEPROM 336**. The parameters stored in the EEPROM look-up table include the regulation complex impedance at neutral (Zn), the complex impedance for a single discrete tap (Ztp), the percent full scale range of regulation (Rreg) and the maximum series winding compensation percentage (Ztp). These values are determined and programmed (into the EEPROM) at the factory or by a field engineer.

The tap changing mechanism, transformer and switch are shown in more detail in FIG. 5. The components of FIG. 5 are part of a conventional voltage regulator transformer assembly and thus, most will not be described in detail here. The tap changing mechanism 404 is operated by a stepper motor 502 which is in turn operated by way of raise (J) and lower (K) control signals. The operations counter switch 338 is operated by a cam 504 which rotates half a turn each time a tap change is made. One side of the switch 338 is connected to AC return ("E" ground). The Operations Counter signal that is input to the controllers is thus alternately (1) open circuit and (2) close closed to ground, each time a tap change occurs.

The series winding load current (I) is determined from the values generated by a current transformer 340. The input voltage is measured between the S and SL bushings. The output voltage Vout is measured between the L and SL bushings. As previously described, these values are scaled, converted to digital form and read by the microprocessor 334. The input voltage is corrected by the microprocessor to compensate for errors in the turns ratio of the regulator utility winding 342. The power factor (pf) is derived from the fundamental voltage and current frequencies represented by the ratio of real power (watts) to apparent power (VA).

The regulator voltage output under condition of forward power flow is determined as follows:

$$Vout = Vin + \left( Kreg \times \frac{TP}{16} \times Vin \right) - Ivec \times (Zn + (Tap \times Ztp))$$

Where:

Tap=Regulator "tap" position rounded to the nearest integer ("+"=raise, "–"=lower);

Vin=corrected regulator utility winding voltage;

Vout=Regulator output voltage;

Rreg=percent full scale range of regulation;

Wsc=maximum series winding compensation percentage;

Rreg=Rreg+Rref×Wsc (where Kreg as total regulator gain is positive for raise/negative for lower);

Ivec=|I|cosθ–j|I|sinθ (where "–j" represents lagging current with positive power factor (pf);

I=magnitude of regulator series winding load current;

$\theta = \cos^{-1}(pf)$ pf=regulator load power factor;

Zn=regulator complex impedance at Neutral (Tap position=0)

Ztp=complex impedance for a single discrete tap. Solving for "Tap" we then have, $$Tap^{-16}|_{16} = (Vout - Vin + Ivec \times Zn) / \left( \left( Kreg \times \frac{Vin}{16} \right) - Ivec \times Ztp \right)$$

The look-up table can be organized in a number of different ways. For example, in a first embodiment (embodiment 1), Rreg, Zn, Ztp and Wsc can be stored in groups indexed to regulator transformer model numbers (as illustrated in FIG. 6). In a another embodiment (embodiment 2) the look-up table data can be stored in the EEPROM such that the maximum series winding compensation (Wsc) and the percent full scale range of regulation (Rreg) can be determined by using the regulator type (straight or inverted) and the regulator complex impedance at neutral (Zn) as an index. The complex impedance for a single discrete tap (Ztp) can be determined by using the nameplate load voltage and current transformer ratings as an index.

In embodiment 1, when a regulator controller is first placed in service or configured at the factory with a particular transformer a technician or engineer invokes an initialization task and enters the transformers model number using the controller's keypad. The initialization task then reads the Rreg, Zn, Ztp and Wsc parameters from the table and stores them in a working area of the EEPROM memory 336. In embodiment 2, when a regulator controller is first placed in service or configured at the factory with a particular transformer, a technician or field engineer invokes an initialization task and enters the regulator type and nameplate values using the controller's keypad. The parameters are then determined and stored in a similar manner as embodiment 1.

Figure 1:
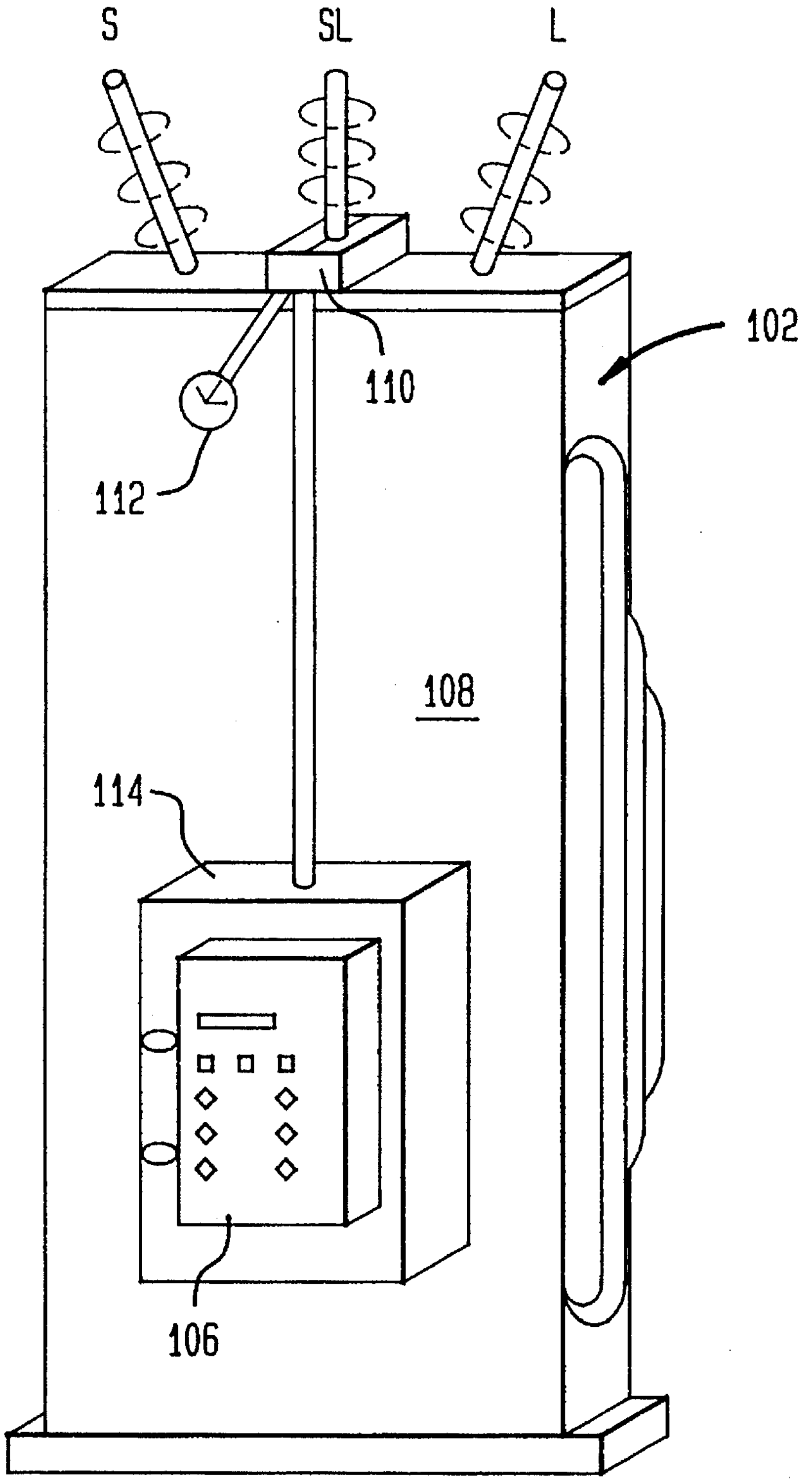
FIG. 1 (PRIOR ART)
FIG. 1 shows a conventional voltage regulator transformer assembly and controller.
Figure 2:
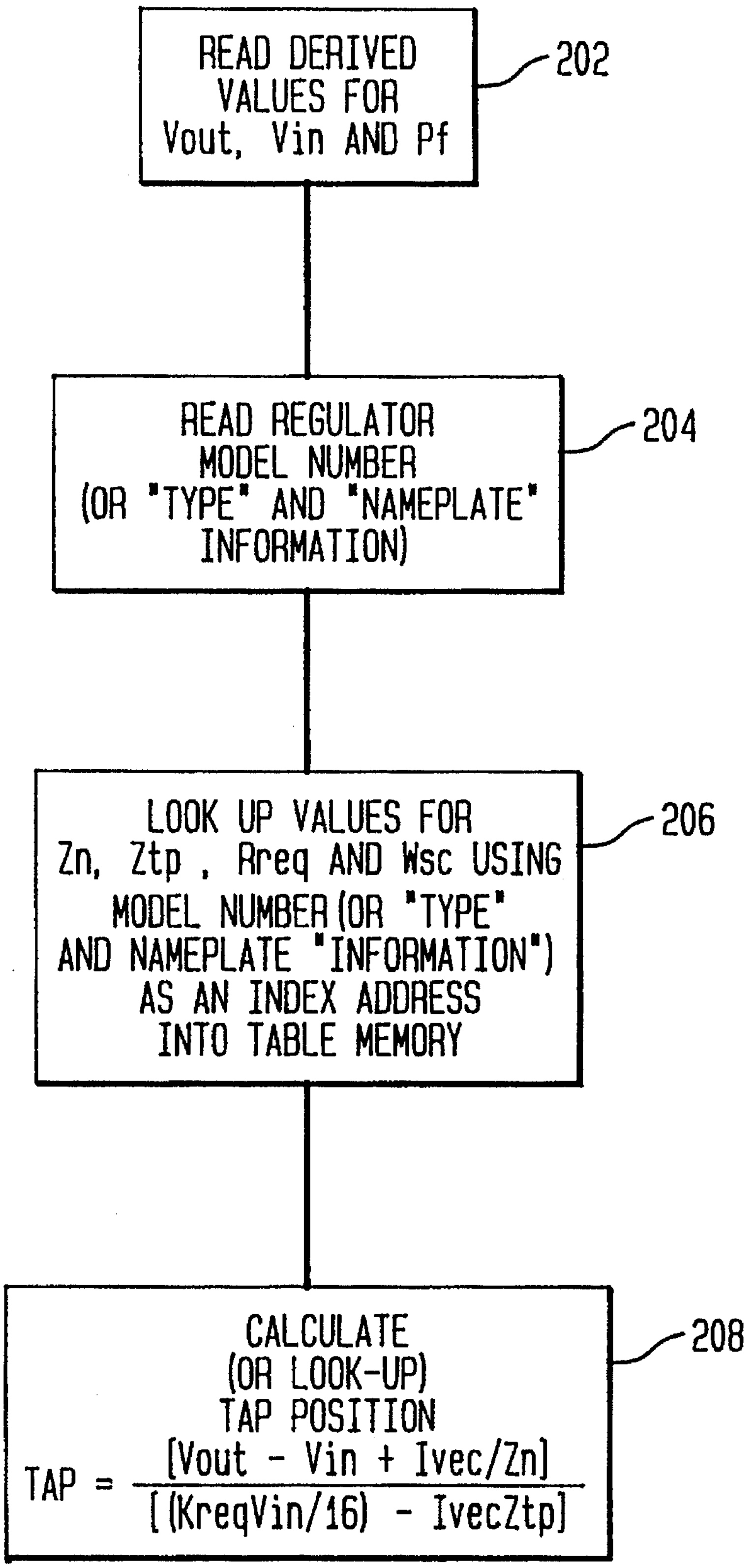
FIG. 2 is a flow chart of tap position determination according to an embodiment of the present invention.

The tap position determination task 340 will now be described in more detail by reference to FIG. 2. In step 202 Vout, Vin, I and pf are derived from the measured analog inputs from the transformer 304. The analog inputs are scaled and brought the uP by way of the high voltage interface 314. Then, in step 204 the microprocessor reads the stored regulator type and name plate information (or model number) and in step 206 looks up the values for Zn, Ztp, Rref and Wsc from the preprogrammed tables stored within the EEPROM.

In step 208, the uP computes Ivec and Kreg as a function of the data derived and determined in steps 202 and 204 respectively. Finally, in step 210 the tap position is determined by reference to the previously described equation, which is solved by having the microprocessor perform the described calculations.

The present invention may be embodied as an improvement to the base circuitry and programming of an existing microprocessor based voltage regulator controllers. An example of a controller having suitable base circuitry and programming is the Siemens MJX voltage regulator controller, available from Siemens Energy and Automation, Inc. of Jackson, Miss., U.S.A.

Figure 4:
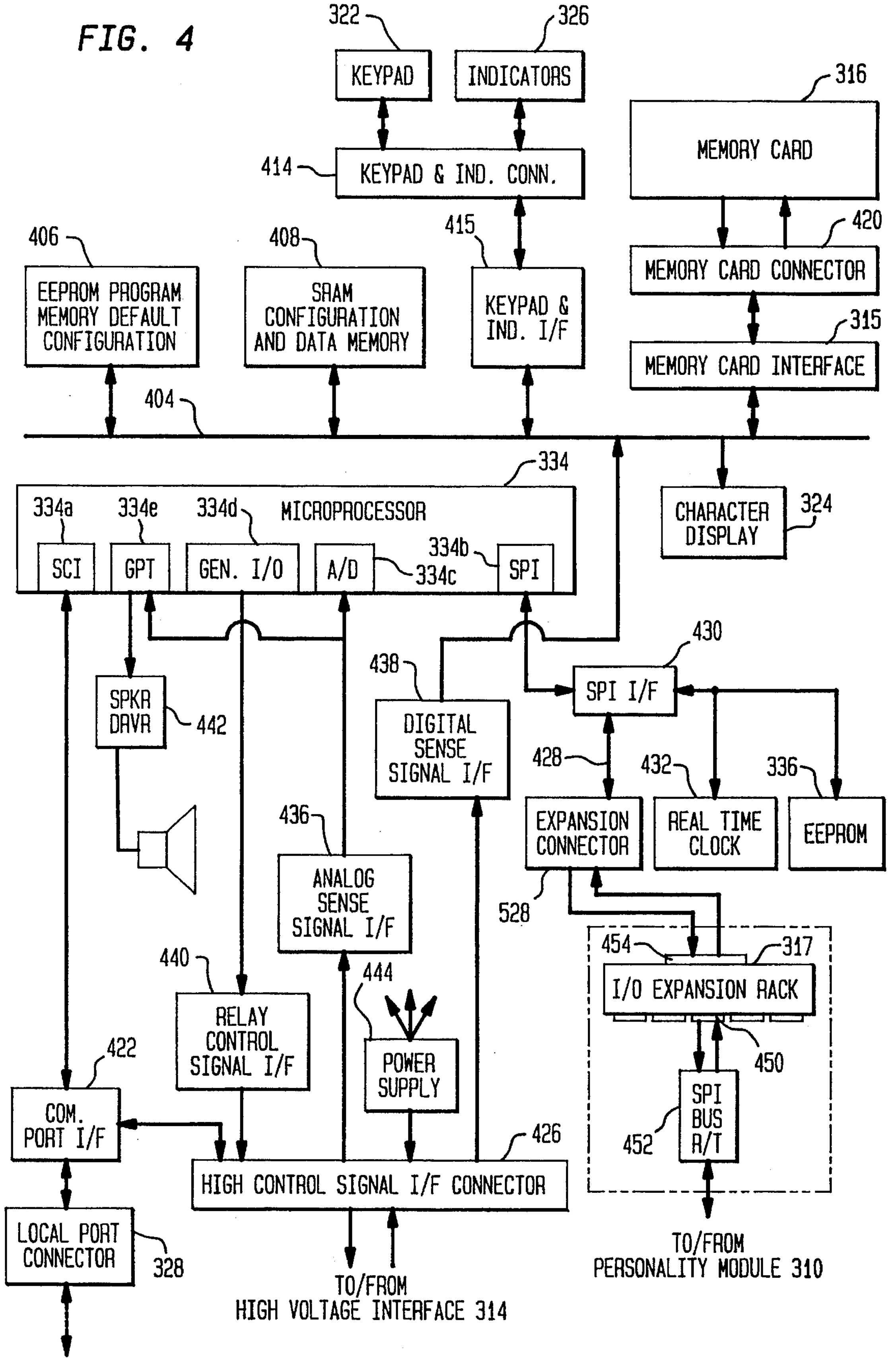
FIG. 4 is a more detailed diagram of the processor board of FIG. 3 showing its interconnection to other components of the voltage regulator controller.
Figure 5:
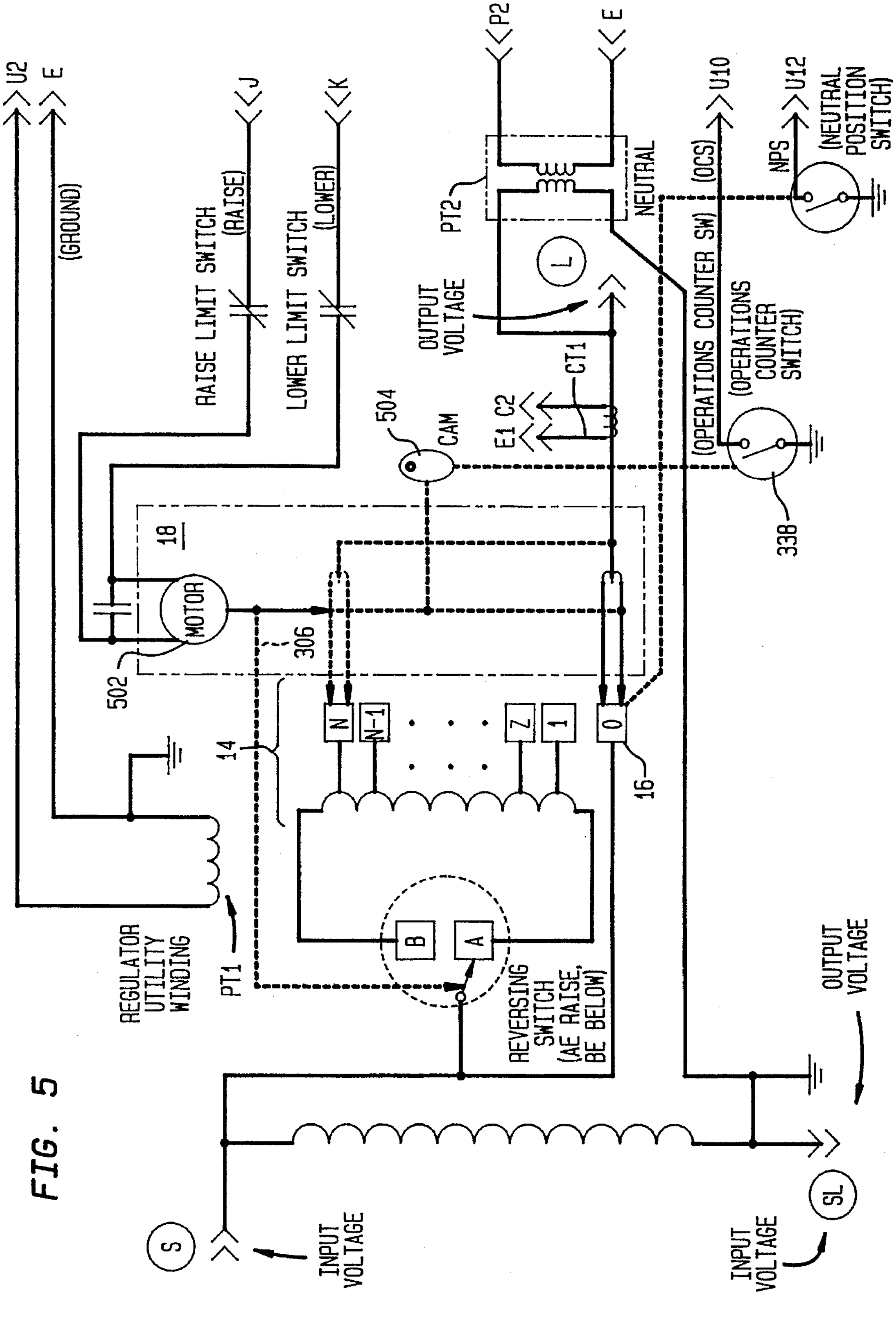
FIG. 5 is a more detailed diagram of the step-transformer, tap changing mechanism and operations counter of FIG. 3.

A more detailed block diagram of the processor section 312 and its interconnection other elements of the voltage regulator controller is illustrated in FIG. 4.

The processor section 312 includes the microprocessor 334 (for example, a Motorola 68HC16) which is coupled to the other processor elements by way of a common bus 404. An electrically erasable programmable read only memory (EEPROM) 406 includes the microprocessor's program instructions and default configuration data.

A static type random access memory (SRAM) 408 stores operator programmed configuration data and includes areas for the microprocessor 334 to store working data and data logs.

The microprocessor 334 also communicates with the alphanumeric character display 324, the keypad 322 and indicators 326 and the memory card interface 315 via the bus 404.

The keypad 322 and indicators 326 are coupled to the bus 404 via a connector 414 and a bus interface 415. As previously described, a memory card 316 can be coupled to the bus 404 by way of a conventional PCMCIA standard interface 315 and connector 420.

Operational parameters, setpoints and special functions including metered parameters, log enables, log configuration data and local operator interfacing are accessed via the keypad 322. The keypad is preferably of the membrane type however any suitable switching device can be used. The keypad provides single keystroke access to regularly used functions, plus quick access (via a menu arrangement) to all of the remaining functions.

The microprocessor 334 includes an SCI port **334*a* which is connected to a communication port interface 422. The communication port interface 422 provides the SCI signals to the external local port 328 on the controller's front panel 320. An isolated power supply for the communication port interface 422 is provided by the high voltage interface 314 via a high voltage signal interface connector 426**.

The communication port interface 422 supports transfer of data in both directions, allowing the controller to be configured via a serial link, and also provides meter and status information to a connected device. In addition to supporting the configuration and data retrieval functions required for remote access, the communication port interface 422 supports uploading and/or downloading of the program code for the microprocessor 334.

The communication port interface 422 can be, for example, an RS-232 compatible port. The local port connector 328 can be used for serial communication with other apparatus, for example a palmtop or other computer. The physical interface of the local port connectors 328 can be a conventional 9-pin D-type connector whose pin-out meets any suitable industry standard.

The microprocessor 334 also includes a SPI port 334*b* which is connected to an expansion connector 428 by way of an SPI interface 430. The expansion connector brings the SPI bus 318 out to the I/O expansion chassis 317 via a cable. Other devices that reside on the SPI bus include a real time clock 432 and the serial EEPROM 336. The real time clock can be used to provide the time and date and data indicative of the passage of programmed time intervals. The serial EEPROM 336 stores operator programmed configuration data, the look-up tables 336*a*, 336*b* and the operations count. The operator programmed configuration data is downloaded to the SRAM 408 by the microprocessor 334 when the processor section 312 is initialized. The SRAM copy is used, by the microprocessor, as the working copy of the configuration data. The real time clock 432 is programmed and read by the microprocessor 334.

The high voltage signal interface connector 426 provides a mating connection with a connector on the high voltage interface 314. Scaled analog signals from the high voltage interface 314 (including scaled versions of I, Vin and Vout) are provided to an A/D converter port 334*c* by way of an analog sense signal interface 436. The analog sense signal interface 436 low pass filters the scaled analog input signals prior to their provision to the A/D converter port 334*c*. Digital signals from the high voltage interface 314 are provided to the bus 404 via a digital sense signal interface 438. The digital sense signal interface 438 provides the proper timing, control and electrical signal levels for the data.

Control signals from the microprocessor's general I/O port 334*d* are provided to the high voltage signal interface connector 426 by way of a relay control signal interface 440. The relay control signal interface converts the voltage levels of the I/O control signals to those used by the high voltage interface 314. A speaker driver 442 is connected to the GPT port 334*e* of the microprocessor 334. The processor section 312 also includes a power supply 444 which provides regulated power to each of the circuit elements of the processor section 312 as needed. The high voltage interface 314 provides an unregulated power supply and the main 5 volt power supply for the processor section 312.

The microprocessor 334 recognizes that a memory card 316 has been plugged into the memory card interface 315 by monitoring the bus 404 for a signal so indicating. In response, the microprocessor 334 reads operator selected control parameters entered via the controller's keypad 322. Depending on the control parameters, the microprocessor either updates the programming code in its configuration EEPROM 406, executes the code from the memory card 316 while it is present but does not update its EEPROM 506, or dumps selected status information to the memory card 316 so that it can be analyzed at a different location. As an alternative embodiment, the processor section 312 can be programmed to default to the memory card program when the presence of a memory card is detected. In this case, upon detection, the program code from the memory card would be downloaded to the SRAM 408 and executed by the microprocessor from there.

The I/O expansion chassis (rack) 317 includes a number (e.g. 6) of connectors 450 for receiving field installable, plug-in I/O modules 452. The connectors 450 are electrically connected to the SPI bus 318 via a common processor section interface connector 454 and couple the I/O module(s) 452 to the SPI bus 318 when they are plugged into the chassis.

The processor section 312 can communicate with the personality module 310 in a number of ways. For example, the microprocessor 334 can be provided with conventional RS-232 interface circuitry to the SCI bus. A conventional RS-232 cable can then be used to connect this RS-232 interface to an RS-232 interface on the personality module. Alternatively, an I/O module (SPI BUS R/T) in the I/O expansion chassis can provide the physical and electrical interface between the SPI bus 318 and a cable connected to the personality module. An SPI R/T or other communications port can also be used to provide outside access to the controller's data logs and configuration parameters otherwise accessible on the front panel.

Figure 7:
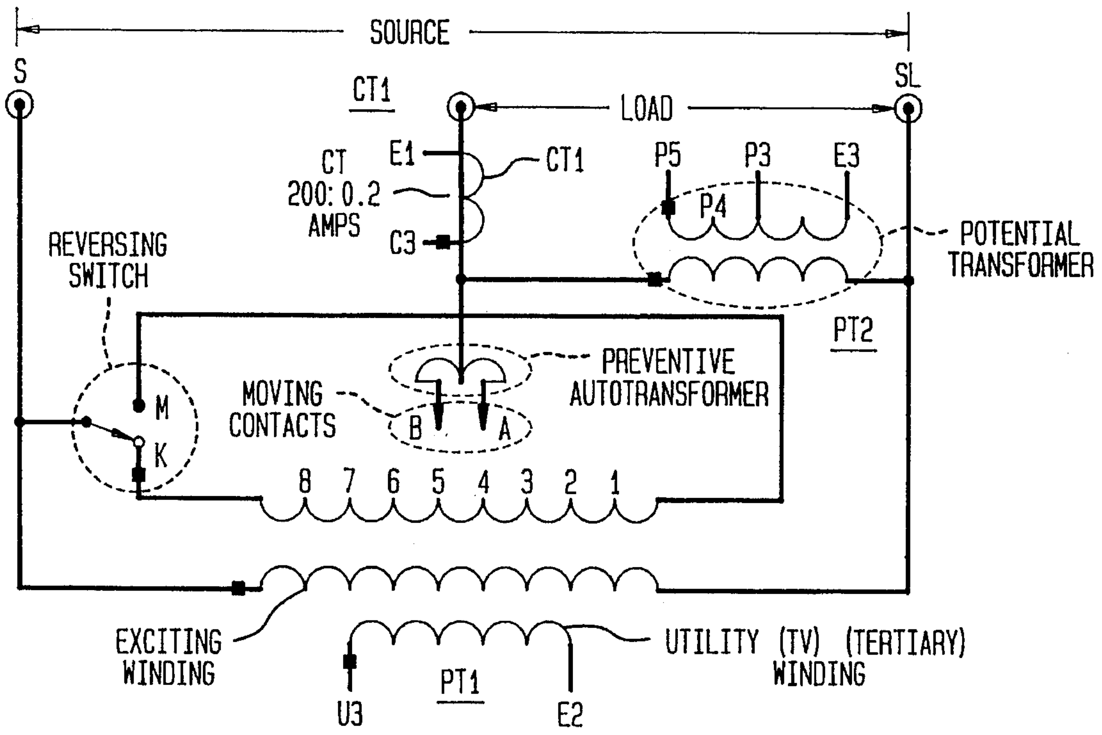
FIG. 7 shows a typical connection for a "straight" design regulator.

FIG. 7 shows a typical connection for a "straight" design regulator. A straight design regulator has a potential transformer (PT) connected between the "L" and "SL" bushings, and utility tertiary. The PT secondary leads are labeled P3, P4, P5, etc. The utility winding (Tv) leads are labeled U3, U4, U5, etc.

Figure 8:
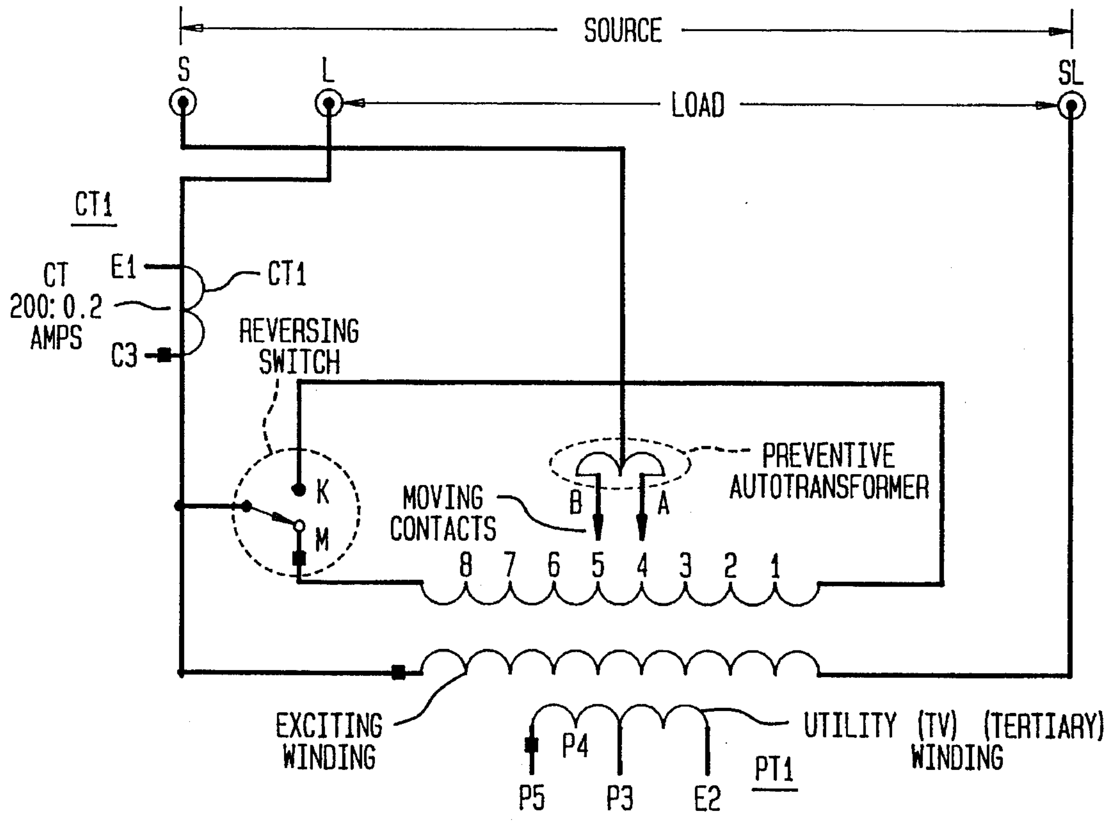
FIG. 8 shows a typical connection for an "inverted" design regulator.

FIG. 8 shows a typical connection for an "inverted" design regulator. An inverted design regulator has only a utility (tertiary) winding (no potential transformer) unless specially equipped. The Tv leads are labeled P3, P4, P5, etc. The preventative autotransformer is connected to the "S" bushing.

Now that the invention has been described by way of the preferred embodiment, various modifications, enhancements and improvements which do not depart from the scope and spirit of the invention will become apparent to those of skill in the art. Thus, it should be understood that the preferred embodiment has been provided by way of example and not by way of limitation. The scope of the invention is defined by the appended claims.

What is claimed is:

1. A voltage regulator controller for use with a multi-tap voltage regulator transformer capable of producing an output voltage from an input voltage and having a plurality of tap positions for adjusting the output voltage in discrete tap position steps, comprising:

at least one sensor for generating a first scaled signal indicative of the load current of the multi-tap transformer;

a plurality of scaling transformers for generating a second scaled signal indicative of the input voltage and a third scaled signal indicative of the output voltage of the multi-tap transformer;

a random access memory having a look-up table formed thereon, the look up table including a cross reference between first data indicative of regular type and second data indicative of inherent electrical parameters of the multi-tap transformer and having program code for determining a position of the tap from the load current, the input voltage, the output voltage and the electrical parameters provided by the look up table; and, a microprocessor coupled to the random access memory, the at least one sensor and the plurality of scaling transformers for determining the tap position responsive to execution of the program code.

2. The voltage regulator controller of claim 1, further comprising an analog to digital converter connected to receive the first scaled signal, the second scaled signal and the third scaled signal and having an output connected to the microprocessor, for providing the microprocessor with digital representations of the first scaled signal, the second scaled signal and the third scaled signal.

3. The voltage regulator controller of claim 1 wherein the microprocessor determines the tap position as $$Tap^{-16}|_{16} = (Vout - Vin + Ivec \times Zn) / \left( \left( Kreg \times \frac{Vin}{16} \right) - Ivec \times Ztp \right)$$

wherein:

Tap=Regulator "tap" position rounded to the nearest integer ("+"=raise, "–"=lower);

Vin=corrected regulator utility winding voltage;

Vout=Regulator output voltage;

Rreg=percent full scale range of regulation;

Wsc=maximum series winding compensation percentage;

Kreg=Rreg+Rreg×Wsc (where Kreg as total regulator gain is positive for raise/negative for lower);

Ivec=|I|cosθ–j|I|sinθ (where "–j" represents lagging current with positive power factor (pf);

I=magnitude of regulator series winding load current;

$\theta=\cos^{-1}(pf)$ pf=regulator load power factor;

Zn=regulator complex impedance of Neutral (Tap position=0)

Ztp=complex impedance for a single discrete tap.

4. The voltage regulator controller of claim 1 wherein the look-up table is formed on a read-only-memory (ROM).

5. The voltage regulator controller of claim 1 wherein the first data indicative of the regulator type includes a regulator model number.

6. The voltage regulator controller of claim 1 wherein the first data indicative of the regulator type includes information indicative of the regulator transformer being one of straight or inverted.

7. The voltage regulator controller of claim 1 wherein the electrical parameters include the complex impedance for a single discrete step of the multi-tap transformer and the complex impedance of the multi-tap transformer when the tap is at a neutral position.

8. The voltage regulator controller of claim 1 further comprising an additional look-up table formed in the random access memory, the additional look-up table including a cross-reference between the inherent electrical parameters and measured regulator voltage and current values and transformer tap position.

9. The voltage regulator of claim 4 wherein the ROM is of an electrically erasable type.

10. A method of determining tap position in a multi-tap voltage regulator transformer having a first terminal for receiving an input voltage, a plurality of tap positions for adjusting an output voltage in discrete tap position steps, and a second terminal for providing the output voltage to a load, comprising the steps of:

measuring the input voltage;

measuring the output voltage;

measuring the magnitude of the regulator's series winding current;

determining a power factor (pf) of the transformer;

determining the regulator complex impedance at neutral;

determining the regulator complex impedance for one of the discrete tap position steps;

determining the maximum series winding compensation percentage;

calculating the derived tap position as a function of the input voltage, the output voltage, the power factor, the series winding current, the regulator complex impedance at neutral, the regulator complex impedance for the one of the discrete tap position steps and the maximum series winding compensation percentage; and, operating the regulator tap changing mechanism based on tap change decisions which assume that the derived tap position is a current tap position.

11. The method of claim 10 wherein the operating includes the step of comparing the derived tap position against a limit tap position and preventing tap excursions as determined from the derived tap position from exceeding the limit tap position.

12. The method of claim 10 wherein the operating includes moving the tap to a neutral position as determined from the derived tap position.

13. A method of determining tap position in a multi-tap voltage regulator transformer having a first terminal for receiving and input voltage, a plurality of tap positions for adjusting an output voltage in discrete tap position steps, and a second terminal for providing the output voltage to a load, comprising the steps of:

measuring the input voltage;

measuring the output voltage;

measuring the regulators' series winding current;

reading, from a memory, stored information identifying inherent electrical characteristics of the multi-tap transformer;

determining a power factor (pf) of the transformer;

calculating the derived tap position as a function of the input voltage, the output voltage, the power factor, the series winding current and the inherent electrical parameters; and, operating the regulator tap changing mechanism based on tap change decisions which utilize the derived tap position as a current tap position.

14. The method of claim 13 wherein the inherent electrical parameters are determined by referencing a look-up table stored in a random access memory.

15. The method of claim 14 wherein the look-up table is referenced by a predetermined model number of the multi-tap transformer.

16. The method of claim 14 wherein the random access memory is a read only memory.

17. The method of claim 16 wherein the read only memory is accessed by a microprocessor.

18. A method of determining tap position in a multi-tap voltage regulator transformer of a type having plurality of tap positions for adjusting an output voltage in discrete tap position steps, comprising the steps of:

reading, from a memory, stored information identifying inherent impedance characteristics of the multi-tap transformer;

determining a calculated tap position as a function of the inherent impedance characteristics, measured regulator current values and measured regulator voltage values; and, operating the regulator tap changing mechanism based on tap change decisions which utilize the calculated tap position as a current tap position.

19. The method of claim 18 wherein the inherent impedance characteristics are determined by referencing a look-up table stored in the memory and wherein the memory is a read only memory (ROM).

20. The method of claim 19 wherein the look-up table is referenced by a predetermined model number of the multi-tap transformer.

* * * * *